Nov. 19, 1957 D. V. FRANKE ET AL 2,813,936
SWITCH

Filed Jan. 24, 1955 2 Sheets-Sheet 1

INVENTORS.
DALLAS V. FRANKE
ERNEST R. ANKER
BY THEIR ATTORNEYS.
HARRIS, KIECH, FOSTER & HARRIS

Nov. 19, 1957  D. V. FRANKE ET AL  2,813,936
SWITCH
Filed Jan. 24, 1955  2 Sheets-Sheet 2

INVENTORS.
DALLAS V. FRANKE
ERNEST R. ANKER
BY THEIR ATTORNEYS.
HARRIS, KIECH, FOSTER & HARRIS 2,813,936
Patented Nov. 19, 1957

2,813,936
SWITCH

Dallas V. Franke, Redondo Beach, and Ernest R. Anker, Los Angeles, Calif., assignors to Cal-Tronics Corporation, Los Angeles, Calif., a corporation of Nevada Application January 24, 1955, Serial No. 483,473

10 Claims. (Cl. 200—5)

The present invention relates to a new and improved switch construction. More specifically, it relates to a switch construction which is specifically designed to be used in testing individual pairs of wires within a multiwire cable to determine if any short circuits exist within the cable, although obviously this switch can be employed for other purposes. A general object of this invention is to provide a switch construction having the characteristics and advantages indicated in this specification.

This invention may be briefly summarized as embodying a base serving to support a terminal panel and flexible contacts attached to this panel; two separate grounding rings, each of which is in contact with part of said flexible contacts; a rotary shaft; and means attached to said shaft for lifting selected flexible contacts from each of these grounding rings and simultaneously electrically connecting the so-lifted contacts. The claims forming a part of this specification more specifically summarize or define the precise nature of the invention. Further details with respect to it will be apparent from the remainder of this specification and the accompanying drawings, in which:

Figure 1:
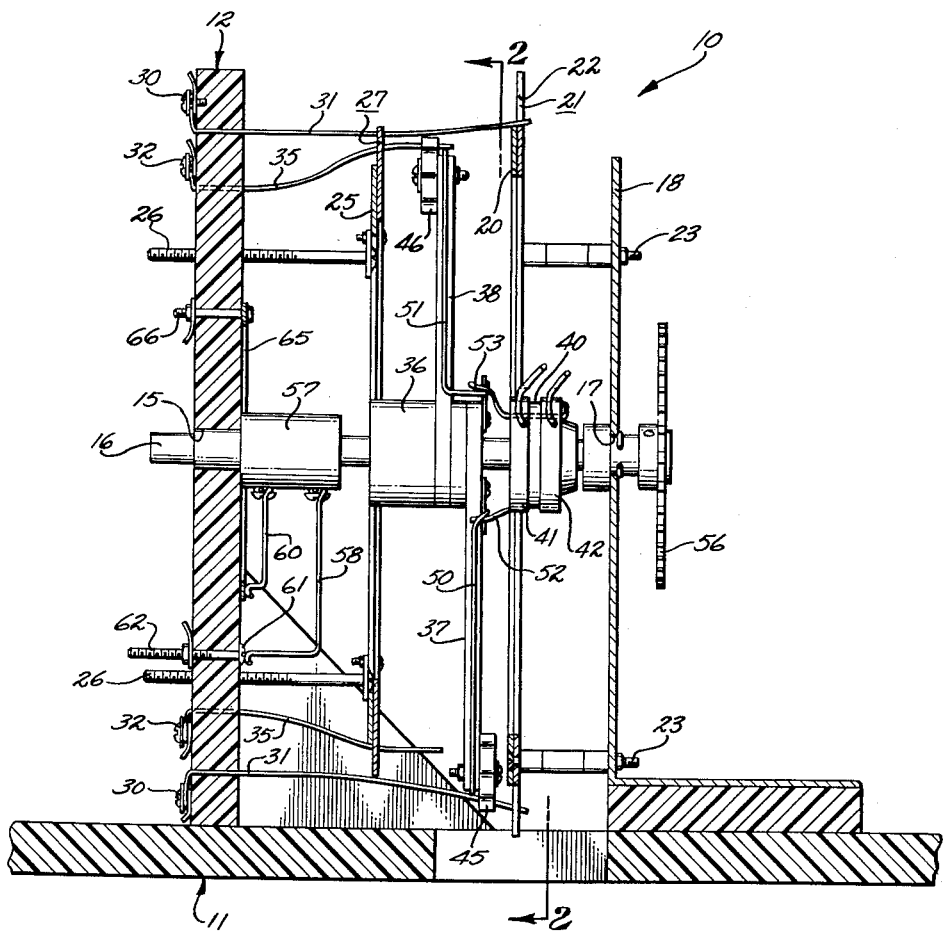
Fig. 1 is a side, partially sectional view of a switch of the invention.

In the drawings, there is shown a switch 10 having a base 11 to which there is attached an upstanding terminal panel 12 formed of an insulating material such as polymethacrylic acid. Within this panel 12, there is formed a hole 15 serving as a bearing for one end of a rotatable, nonconductive shaft 16. The other extremity of this shaft 16 is supported within another hole 17 in an upstanding support 18 which is secured to the base 11 at a point remote from the panel 12.

A first conductive grounding ring 20 is secured parallel to the support 18 between this support and the panel 12 by bolts 23 so as to be centered about the shaft 16. One side of the grounding ring 20 is fastened by these same bolts to a nonconductive ring 21 of the same internal diameter as the ring 20, but of larger external diameter than this latter ring. Within the periphery of the ring 21, there are located a plurality of radial slots 22 extending in towards the shaft 16 a distance which is slightly greater than the distance from the periphery of the ring 21 to the periphery of the ring 20.

A second conductive grounding ring 25 is secured symmetrically about the shaft 16 by bolts 26 attaching it to the panel 12. This second ring 25 is of smaller external diameter than the ring 20; is parallel to the ring 20; and is attached to a nonconductive ring 27 of similar construction to the nonconductive ring 21. Thus, this nonconductive ring 27 is of larger external diameter than the ring 25 and is provided with radial slots 28 extending from the outer periphery of the ring 27 towards the shaft 16 a distance which is slightly greater than the distance from the outer periphery of this same ring to the periphery of the ring 25.

Figure 2:
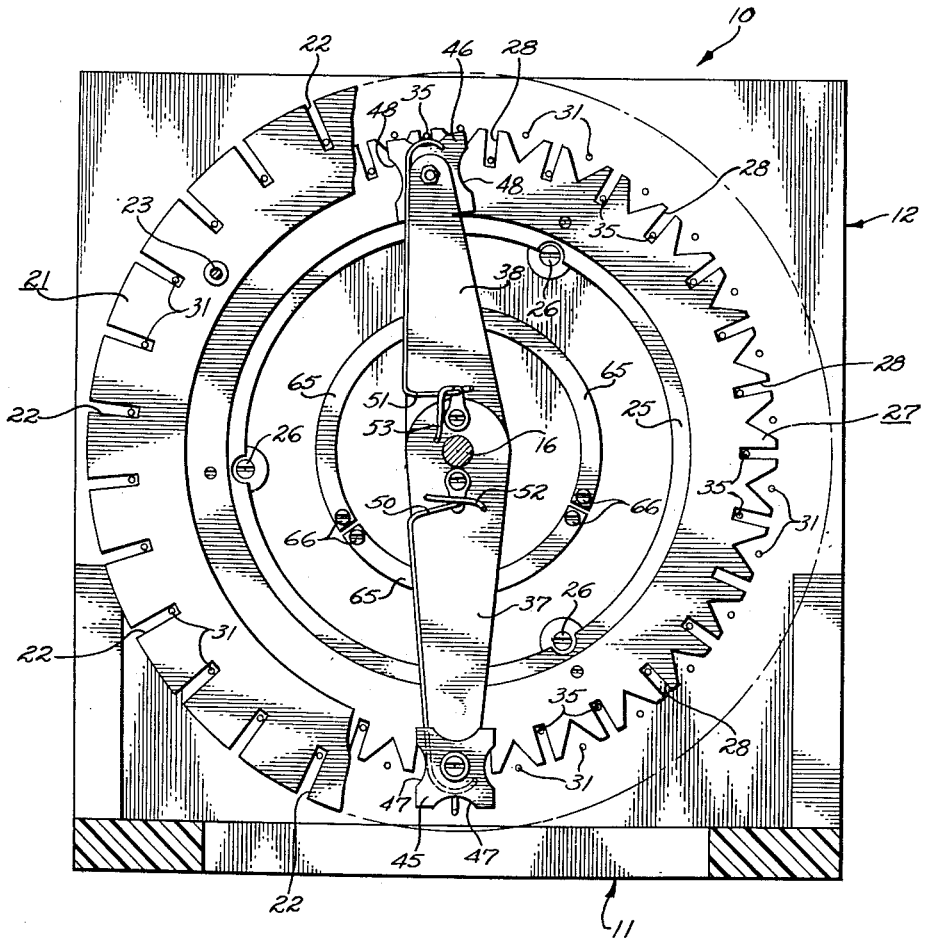
Fig. 2 is a view taken at line 2—2 of Fig. 1 which is broken away to reveal certain constructional details.

The panel 12 is provided with a number of terminals 30 arranged in a circle having approximately the diameter of the ring 20 and being symmetrically disposed about the shaft 16. Each of these terminals is attached to a flexible conductive contact 31 extending through the panel 12 to slightly beyond the ring 20. As is best seen in Fig. 2, each of these contacts 31 fits within one of the slots 22 in the ring 21 so as to be normally in electrical contact with the ring 20. With this construction, the contacts 31 can be moved outwardly from the shaft 16 in the slots 22. When so moved and then released, they (the contacts 31) automatically return to their initial position in contact with the ring 20.

The panel 12 is also provided with a number of other terminals 32 which are arranged symmetrically in a circle about the shaft 16, this circle having approximately the same diameter as the second ring 25. A flexible contact 35 of the same general construction and operation as each of the contacts 31 projects from each of the terminals 32 into each of the radial slots 28 where each of these contacts 35 is in electrical communication with the ring 25 unless held outwardly from this ring within the slot 28 within which it is disposed.

Carried upon the shaft 16 between the rings 20 and 25 is an insulating bushing 36 which in turn carries first and second nonconductive arms 37 and 38, respectively, projecting from diametrically opposite sides of the bushing 36. There is also positioned upon this shaft 16 another insulating bushing 40 upon the external surface of which are located electrically connected slip rings 41 and 42.

Planetary gear-like lifters 45 and 46 are rotatably mounted upon the arms 37 and 38 respectively so as to be located generally shortly within the locus of the contacts 31 and 35 as is best shown in Fig. 2 of the drawings. As the shaft 16 is turned, curved notches 47 and 48 within the lifters come in contact with contacts 31 and 35, respectively, on opposite sides of the shaft 16, gradually lifting these contacts from the rings 20 and 25 within the slots 22 and 28. As this occurs, the so-lifted contacts are slidably placed in electrical communication with conductors 50 and 51 secured as by the aid of an adhesive to the arms 37 and 38 so as to project over the ends of these arms in a curve. The conductors 50 and 51 are each attached to conductive brushes 52 and 53, respectively, at the bases of these arms; these brushes project from the arms 37 and 38 so as to bear against the slip rings 41 and 42, as illustrated, in any position of the shaft 16. With the construction illustrated, the arms 37 and 38 are rotated when the shaft 16 is turned; simultaneously, the lifters 45 and 46 rotate upon these arms so that the curved notches 47 and 48 engage the contacts 31 and 35 in the manner in which a planetary gear engages the teeth of a sun gear positioned around the planetary gear. As this occurs, the adjacent contacts are selectively lifted out of electrical communication with the rings 20 and 25 and are placed in electrical contact with the conductors 50 and 51, and then are returned to their initial positions. When one of the contacts 31 is touching the conductor 50 in this arrangement, one of the contacts 35 is touching the conductor 51, placing these two "lifted" contacts in electrical communication with one another.

With the switch 10 several auxiliary means are preferably provided in order to improve the utility of the construction. The first of these is a ratchet wheel 56 which is attached to the end of the shaft 16 adjacent to the support 18; this wheel 56 is designed to be turned by an appropriate conventional mechanism in actually using the switch 10. Obviously, other equivalent means can be employed.

The second of these auxiliary means includes a conductive bushing 57 which is secured to the shaft 16 and which, in turn, carries first and second electrically conductive contact arms 58 and 60, respectively. The arm 58 is of larger dimension than the arm 60 and is designed so as to be placed in electrical contact with any of a series of bolt heads 61 (only one being shown) secured in a circular position upon the panel 12 about the shaft 16. These bolt heads are parts of bolts 62 (only one being shown) projecting through the panel 12; the bolts 62 are adapted to serve as terminals, as will be indicated. The arms 60 are adapted to be in electrical contact with any one of three conductive ring segments 65 also secured to the panel 12 on the side of this panel adjacent the various rings previously discussed. Each of these conductive segments 65 is secured to the panel 12 by means of at least one bolt 66 capable of serving as an electrical terminal. Thus, with the second of these means, it is possible to place the ring segments 65 in electrical communication with the bolts 62. Preferably, these bolts 62 are placed upon the panel so as to correspond with various positions of the arms 37 and 38 so that as a current is sent from the ring segments 65 through the bolts 62 by the various conductive means described, it is possible to determine the position of these arms 37 and 38. Preferably, the bolts 62 and 66 are connected to various electric light bulbs (not shown) in an obvious manner to aid in this purpose.

The exact operation of the switch 10 is comparatively simple. With it, when testing cables, all of the terminals 30 are connected to the conductors coming from one end of a cable and all of the terminals 32 are connected to the conductors coming from the other end of the same cable. The bolts 23 and 26 are then grounded by being connected to conventional ground wires, and the shaft 16 is turned, placing selected pairs of the contacts 31 and 35 in electrical communication with one another. The presence of such current may be readily determined by inserting various light bulbs or other indicating means in circuit with the contacts 31 and 35.

Obviously, the switch 10 is capable of being used in a number of specific manners besides that indicated in the preceding discussion. It is believed that it has utility for such apparatus as pin ball machines, electrical displays, etc. The precise constructional details embodied within the switch 10 are exceedingly important from a commercial standpoint inasmuch as the switch itself is virtually immune to wear, and a comparatively small amount of force is required at any time to turn the shaft 16 to accomplish the desired change in electrical flow. Further, the switch 10 is of such simple construction that it may be easily manufactured with a minimum of difficulty out of standard materials readily available throughout the industry.

Those skilled in the art will realize that the herein described invention is capable of wide modification within the scope of the instant disclosure. Such modifications are to be considered as part of the inventive concept insofar as they are defined by the appended claims.

We claim as our invention:

1. A new and improved rotary switch construction, which includes: a base; a terminal panel supported upon said base; a plurality of flexible contacts attached to said terminal panel so as to project therefrom; a first electrical conductive ring mounted upon said base; a second electrical conductive ring mounted upon said base, each of said rings being in contact with part of said flexible contacts; a rotary shaft positioned above said base so as to be capable of being rotated relative to said base and rings; and means attached to said shaft for selectively lifting flexible contacts from each of said conductive rings.

2. A rotary switch construction as defined in claim 1, wherein said means attached to said shaft for selectively lifting flexible contacts from each of said conductive rings includes: arms mounted on said rotary shaft; and lifters, having a plurality of edge notches adapted to engage said flexible contacts, rotatably mounted to each of said arms, said lifters being capable of being rotated by contact with said flexible contacts as said shaft is rotated so that when said lifters are rotated said lifters serve to remove selected flexible contacts from said conductive rings.

3. A new and improved rotary switch construction, which includes: a base; a terminal panel supported upon said base; a rotary shaft positioned above said base; a plurality of flexible contacts attached to said terminal panel so as to project therefrom; a first electrically conductive ring mounted upon said base so as to be symmetrically disposed about said shaft, the outer periphery of said first electrically conductive ring being in electrical contact with part of said flexible contacts; a second electrically conductive ring mounted upon said base so as to be symmetrically disposed about said rotary shaft, the outer periphery of said second electrically conductive ring being in electrical contact with part of said flexible contacts, said shaft being rotatable relative to said rings and contacts; and means attached to said shaft for lifting selected flexible contacts from said first and said second electrically conductive rings.

4. A new and improved rotary switch as defined in claim 3, wherein said means includes means for placing the so-lifted flexible contacts in electrical communication with one another.

5. A new and improved rotary switch as defined in claim 4, wherein said means includes planetary gear-like lifters rotatably mounted upon arms secured to said shaft.

6. A new and improved rotary switch as defined in claim 5, wherein electrically conductive members are mounted upon said arms in such a manner that when flexible contacts are lifted by said planetary gear-like lifters the so-lifted flexible contacts are placed in electrical communication with the electrically conductive members mounted upon said arms.

7. In an apparatus of the class described, the improvement which comprises: a rotary shaft; a ring disposed symmetrically about said shaft and having an electrically conductive outer periphery, said shaft being rotatable relative to said ring; a plurality of flexible electrical contacts biased against the outer periphery of said ring; and means attached to said rotary shaft for selectively lifting the flexible contacts from the outer periphery of said ring, said ring including a plurality of electrically nonconductive guides for engaging said electrical contacts while being lifted.

8. In a device of the class described, the improvement which comprises: a rotary shaft; a ring symmetrically mounted about said shaft; a plurality of flexible contacts normally biased against the outer periphery of said ring; at least one arm secured to said shaft; and a planetary gear-like lifter having peripheral notches rotatably mounted upon said arm so that as said shaft is turned said arm is turned and said planetary gear-like lifter is turned by contact with adjacent flexible contacts, lifting said flexible contacts from said periphery of said ring.

9. In a rotary switch, the combination of: an electrically conductive ring; an electrically nonconductive ring positioned adjacent said conductive ring, said nonconductive ring extending radially beyond said conductive ring, said nonconductive ring having a plurality of notches in the periphery thereof; a plurality of flexible electrical contacts positioned in said notches and normally biased against the periphery of said conductive ring; a shaft rotatably mounted relative to said rings and contacts; an arm carried by said shaft; and notched wheel means rotatably mounted on said arm adjacent the outer end thereof, said arm and wheel means being rotatable in parallel planes, the distance from the axis of rotation of said shaft to the axis of rotation of said wheel means being different than the distance from said axis of rotation of said shaft to said periphery of said conductive ring so that as said arm is rotated by said shaft, one of said flexible contacts engages said wheel means, rotating said wheel means and lifting said one contact from said conductive ring.

10. A rotary switch as defined in claim 9 including an electrical conductor carried by said arm adjacent said wheel means, said electrical conductor having a contact area in line with the centers of said shaft and said wheel means for engaging said flexible contact after said flexible contact has been lifted from said conductive ring.

References Cited in the file of this patent

UNITED STATES PATENTS

| 2,278,629 | Winning | Apr. 7, 1942 |
| 2,284,816 | Harrington et al. | June 2, 1942 |
| 2,432,682 | Robson | Dec. 16, 1947 |

FOREIGN PATENTS

| 433,972 | Great Britain | Aug. 23, 1935 |